United States Patent
Cathey, Jr. et al.

[11] Patent Number: 5,870,179
[45] Date of Patent: Feb. 9, 1999

[54] APPARATUS AND METHOD FOR ESTIMATING RANGE

[75] Inventors: Wade Thomas Cathey, Jr., Boulder; Edward Raymond Dowski, Jr., Lafayette, both of Colo.

[73] Assignee: The Regents of the University of Colorado, Boulder, Colo.

[21] Appl. No.: 473,372

[22] Filed: Jun. 7, 1995

Related U.S. Application Data

[63] Continuation-in-part of Ser. No. 83,829, Jun. 25, 1993, Pat. No. 5,521,695.

[51] Int. Cl.⁶ .............................. G02B 7/04; H04N 7/18; G04C 21/00
[52] U.S. Cl. ..................... 356/4.01; 250/201.2; 348/135; 364/458
[58] Field of Search ........................ 356/4.01; 250/201.2; 348/135; 364/458

[56] References Cited

U.S. PATENT DOCUMENTS

| | | | |
|---|---|---|---|
| 3,856,400 | 12/1974 | Hartmann et al. ..................... | 356/28 |
| 3,873,958 | 3/1975 | Whitehouse . | |
| 4,178,090 | 12/1979 | Marks et al. . | |
| 4,276,620 | 6/1981 | Kahn et al. . | |
| 4,466,067 | 8/1984 | Fontana . | |
| 4,573,191 | 2/1986 | Kidode et al. . | |
| 4,589,770 | 5/1986 | Jones et al. . | |
| 4,734,702 | 3/1988 | Kaplan . | |
| 4,794,550 | 12/1988 | Greivenkamp, Jr. . | |
| 4,825,263 | 4/1989 | Desjardins et al. . | |
| 4,843,631 | 6/1989 | Steinpichler et al. . | |
| 5,102,223 | 4/1992 | Uesugi et al. . | |
| 5,128,874 | 7/1992 | Bhanu et al. . | |
| 5,165,063 | 11/1992 | Strater et al. ........................ | 250/201.4 |
| 5,317,394 | 5/1994 | Hale et al. . | |

OTHER PUBLICATIONS

Article "Conoscopic Holography Basics and Physical Basis" by G. Sirat, J. OPT, SOC. Am.A, vol. 9, No. 1 Jan. 1992.

*Primary Examiner*—Stephen C. Buczinski
*Attorney, Agent, or Firm*—F. A. Sirr; E. C. Hancock

[57] ABSTRACT

Range or distance to points is estimated within a scene, while simultaneously imaging the scene. The range to various points within the scene is estimated by imaging at least a first color of light from the scene through an optical mask and a lens onto a CCD, and then digitally processing the first color light intensity values stored in the CCD. At least a second color of light passes through the mask essentially unchanged and is separated from the first color of light before reaching the CCD and used for imaging the scene. The optical mask is designed such that the optical system transformation matrix for the first color of light is rank deficient for a particular set of object ranges. In this way, linear functions can be found to annihilate given sampled image data at a plurality of ranges, independent of the intensity of the light received from the object. A statistical detector is used to determine the closest associated range to the actual range of the point within the scene.

9 Claims, 7 Drawing Sheets

APPARATUS AND METHOD FOR ESTIMATING RANGE

This application is a continuation-in-part of U.S. patent application Ser. No. 08/083,829, filed Jun. 25, 1993 for RANGE ESTIMATION APPARATUS AND METHOD by W. T. Cathey, Jr. and E. R. Dowski, Jr., now U.S. Pat. No. 5,521,695.

This invention was made with Government support awarded by the National Science Foundation. The Government has certain rights in this invention.

BACKGROUND OF THE INVENTION

1. Field of the Invention

This invention relates to apparatus and methods for estimating the range or distance from a camera to various points in a three-dimensional scene viewed by a camera, while simultaneously imaging the scene. More particularly, this invention relates to range estimation utilizing a color mask to effect different colors of light differently, an imaging system for imaging at least one color of light, a single camera system for recording at least another color of light, and digital processing of digital image data that is generated by the camera.

2. Description of the Related Art

Prior inventions directed to estimating the range to various points in a scene, or to accomplishing related goals such as determining object contour or creating a three dimensional image of an object, commonly utilize two spaced apart views of an object, and then triangulate to determine range. Other two camera systems determine range by correlating the image shifting that is required to match the two images that are provided by two spaced apart cameras. U.S. Pat. No. 4,573,191 by Kidode et al. is an example of such a system. Marks et al., U.S. Pat. No. 4,178,090, is a variation which uses an exterior means to split an image with the split image presented to a single camera followed by recordation of both images on a common piece of film.

Devices which do not require the use of two object views, or two cameras, include U.S. Pat. No. 4,794,550 by Greivenkamp, Jr. which discloses enhancement of Moire contouring past the Nyquist frequency limit by utilizing a prior knowledge about the surface of the object viewed. U.S. Pat. No. 4,825,263 by Desjardins et al., discloses a method for determining object contours by shining a grid of light on the object and photographing the resulting reflection. Image processing is employed to detect grid intersection points, and thereby determines surface curvature of the object.

Steinpichler et al., U.S. Pat. No. 4,843,631, discloses a method of pattern recognition utilizing a comparison of the Fourier transform of an image to reference patterns. Uesugi et al., U.S. Pat. No. 5,102,223, discloses illuminating an object with a moving slit beam and comparing the image thus generated with a reference image to measure object curvature.

The publication "Conoscopic holography, 1. Basic principles and physical basis", *J. Opt. Soc. Am.* A/Vol 9, No. 1/January 1992, by Gabrial Y. Sirat discloses a system to estimate the range to an object by utilizing a pair of polarized crystals to produce an image which is a monotonic function of misfocus to the object. The system measures only one distance within the scene.

The need remains in the art for a passive single camera range estimation system that simultaneously images a scene and directly measures range to various points in the scene.

SUMMARY OF THE INVENTION

This invention relies upon a linear system concept of sub-space projection and null-space detection, to thereby form estimates of the distance from an observation location to object blocks.

An object of the present invention is to provide apparatus and methods for imaging a scene and measuring the range to various points in the scene by using a color optical mask placed before a single camera, imaging at least one color of light from the mask, and digitally processing the resulting digital image data from at least another color of light that is recorded by the camera.

Apparatus in accordance with the invention estimates the distance from an observation location to various points in a three-dimensional scene that contains a three-dimensional object while simultaneously imaging the object. A color optical mask at a conjugate plane of the imaging system affects each of the three colors of light from the scene separately and potentially differently. The mask is constructed and arranged to affect at least one color of light so as to yield a singular (geometrically rank deficient), known, imaging system transformation matrix for a predetermined range, or spread, of object distances, thereby encoding object distance information into the intensity of this color of light as it is received from the object and passed through the mask.

A lens receives this distance-encoded light from the mask, and focuses it onto a plane. A charge-coupled device at this plane digitally records the intensity of the distance-encoded light received from the lens. A digital image processor then extracts the distance information from the digitally recorded intensity of the distance-encoded light. At least another color of light is allowed to pass through the mask substantially unchanged. This unchanged light is removed before being received by the charge coupled device and used for conventional imaging.

The optical mask means may comprise optical material having variations in a first color of pigment providing the rank deficient, known, imaging system transformation matrix. At least a second color of pigment preferably is evenly distributed over the mask to allow separate formation of an undistorted image of the scene. For example, a computer-generated image representing the necessary optical mask can be displayed on a high-resolution graphic device and photographically copied onto color film. This photographic film, after development, is an optical mask that represents the non-negative real part of the computer generated image or mask.

If the red channel of light is to be used for ranging, while the green and blue channels are to be used for traditional imaging, the optical mask is constructed and arranged to allow the green and blue wavelengths to pass through essentially unchanged. This is accomplished by building the magnitude of the optical mask with varying intensities of red pigment, while adding a constant amount of blue and green pigment over the mask. The intensity of the red wavelengths are be altered by the red component of the mask, while the constant green and blue components will leave the green and blue wavelengths unchanged except possibly by a constant attenuation factor.

The blue green light is picked off from the red light before the red light is recorded by the CCD such as by employing, for example, a color selective beam splitter. The blue green light is used for conventional imaging or some other purpose.

Those skilled in the art will recognize the aforementioned and other objects, advantages, applications and modifications of the invention upon reference to the following detailed description of the invention, which description makes reference to the drawing.

BRIEF DESCRIPTION OF THE DRAWINGS

FIG. 2 is composed of FIGS. 2A through 2F which taken together show the effect of a mask embodying a simple point spread function for at least one color of light on a three dimensional object image.

FIG. 3 is composed of FIGS. 3A and 3B which show a more complicated point spread function and the magnitude of its associated mask.

DETAILED DESCRIPTION OF THE PREFERRED EMBODIMENTS

Figure 1:
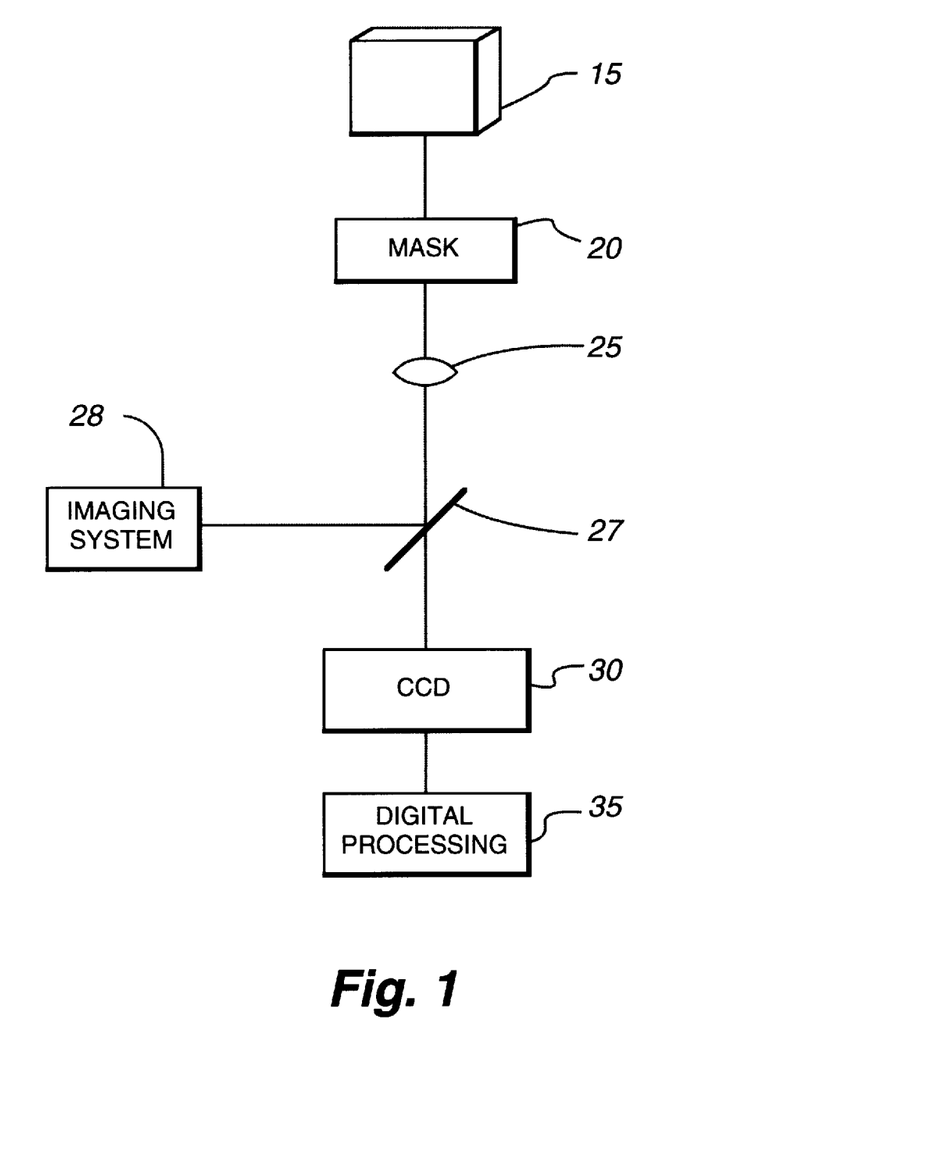
FIG. 1 is a block diagram of a preferred embodiment of the invention.

FIG. 1 discloses the interaction and operation of a multi-component range estimation and imaging system in accordance with the invention. The following description accurately describes the interaction of the system. An appendix that is within the file of this patent gives a complete mathematical description of the ranging portion of the system.

Three-dimensional scene or object 15 is imaged through color optical mask 20 and lens 25 onto color selective beam splitter 27. At least one color of light is transmitted onto Charge Coupled Device (CCD) system 30. Those skilled in the art will appreciate that any image recording and retrieval device equivalent to a CCD could be used in place of CCD system 30. Preferably, but without limitation thereto, object 15 is stationary with respect to lens 25 during the sampling interval of CCD system 30. At least one other color of light is reflected by beam splitter 27 onto conventional imaging system 28, which forms an image of object 15.

Without limitation thereto, color mask 20 is composed of an optical material, such as plastic, having variations in color opaqueness. Mask 20 is designed to yield a rank deficient, known, imaging system transformation matrix, or rectangular array of mathematical elements, for each of a predetermined spread of object ranges; i.e., distances from CCD system 30 to object 15; for at least one color of light. Mask 20 transmits at least one other color of light substantially unchanged, except for a constant attenuation factor.

For example, in a system in which the red channel of light is used for ranging and the blue and green channels of light are used for imaging, the variations in red pigment in the mask are designed to yield a rank deficient, known, imaging system transformation matrix, or rectangular array of mathematical elements, for each of a predetermined spread of object ranges. The blue and green pigment, on the other hand, are constant over the mask to yield an undistorted image of the object.

To accomplish ranging using the red channel of light, a coherent impulse response can be chosen as a linear combination of damped exponentials. The parameters of these damped exponentials are determined by mathematical constraints and by optical system requirements. For a detailed description of how mask 20 is designed to meet particular system requirements, refer to Appendix A.

Figure 2A:
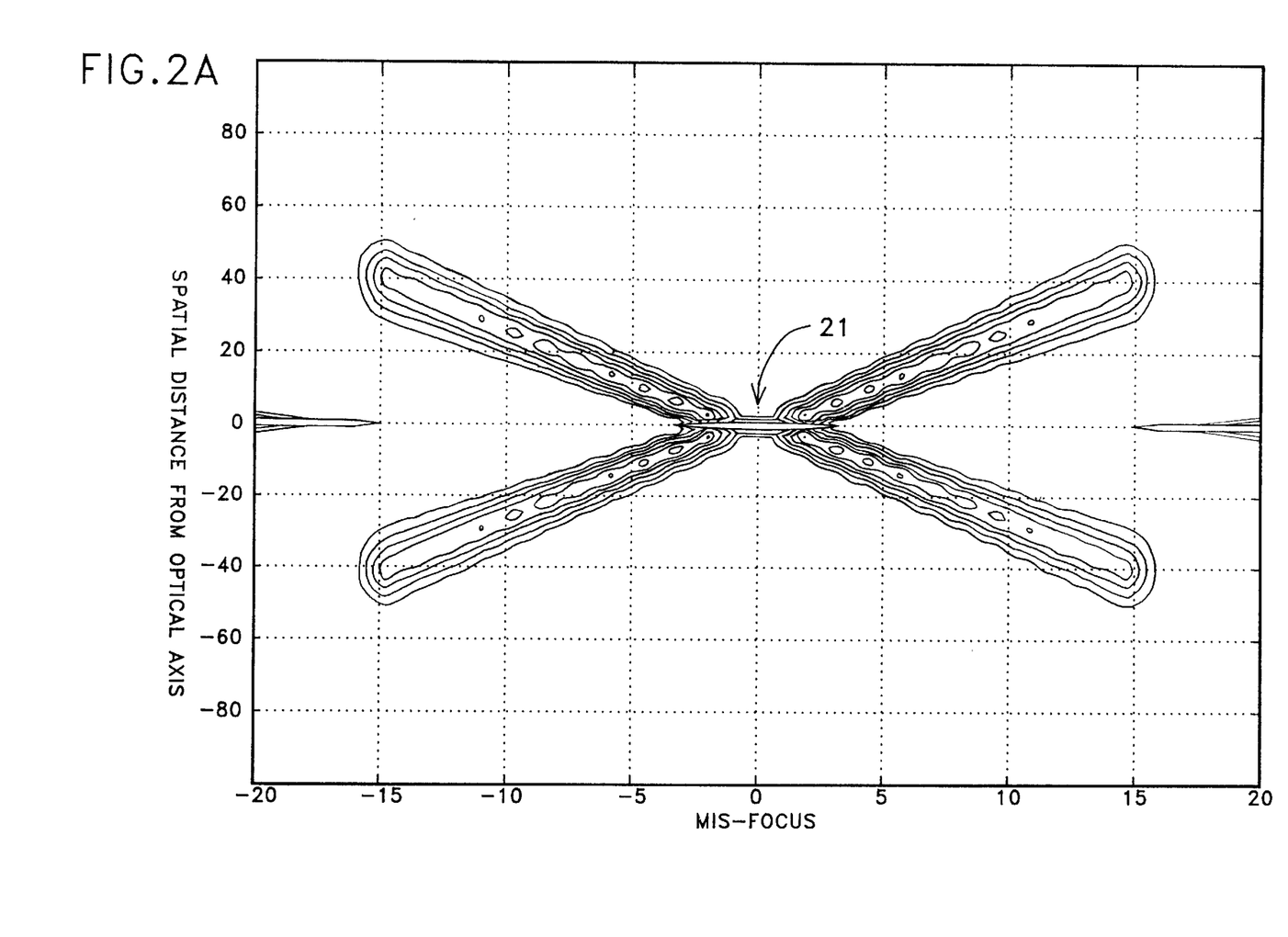
FIG. 2A shows the one-dimensional point spread function (PSF).
Figure 2B:
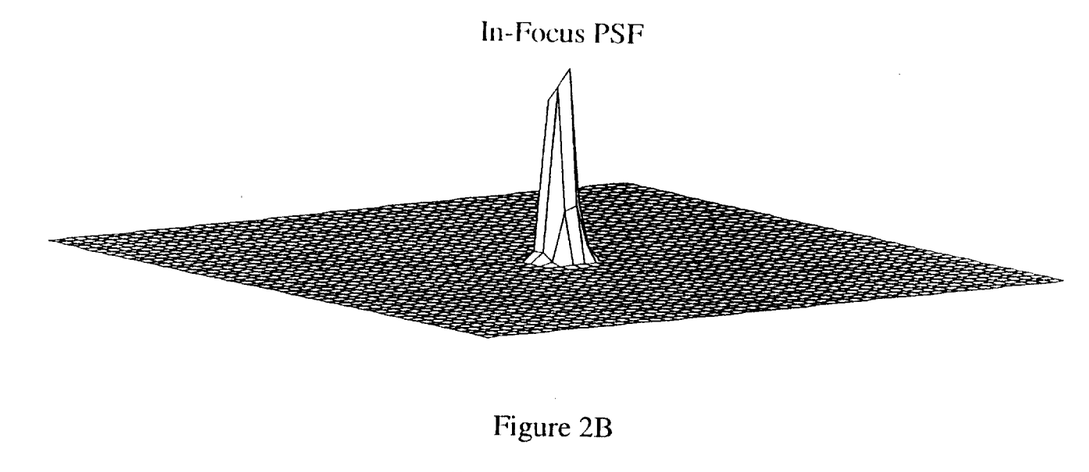
FIGS. 2B and 2C show the two-dimensional impulse response, or point spread function, of points at two distances.

One simple mask has a one-dimensional point spread function for red light as shown in FIG. 2A. Thus, a point on object 15, or impulse of light at the distance designated 21 from CCD system 30, would produce a two-dimensional image like that shown in FIG. 2B, having a gaussian-like response. This image would resemble a dot of light. A point of light at a distance different from 21 would produce an image like FIG. 2C, looking approximately like four gaussian-like shapes. This FIG. 2C image would resemble four dots.

Figure 2C:
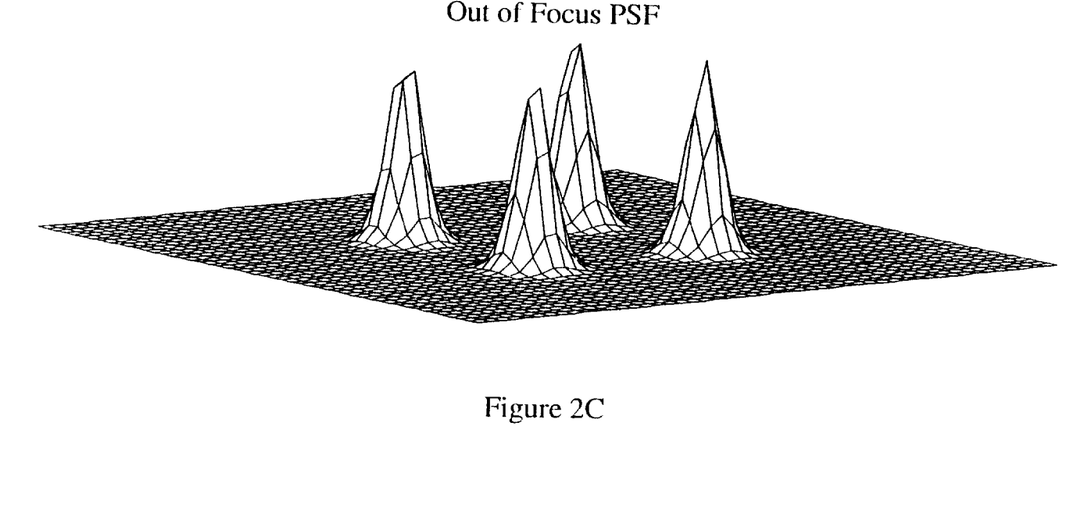

The four peaks of light in FIG. 2C would be farther apart the farther the object point was from distance 21. Thus, object distance, as well as object intensity, is encoded in the red light signal recorded by CCD system 30. This is not, however, how the range is determined. In the case of a general object, the separation could not be measured. This is done by looking for periodic walls in the fourier transform of the image.

Figure 2D:
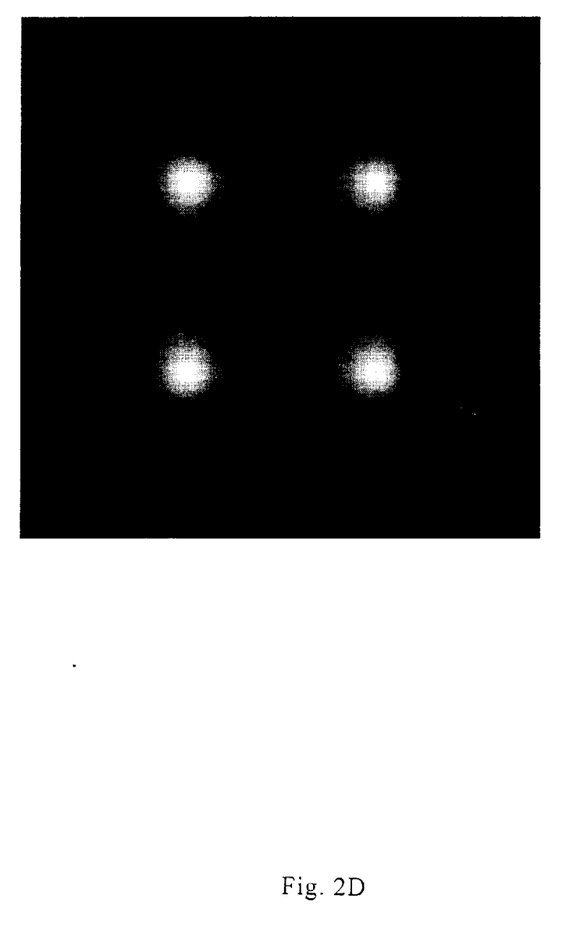
FIG. 2D shows the two-dimensional mask used to implement the point spread function of FIG. 2A.

Typically, the system of FIG. 1 is designed so that point 21 of FIG. 2A is located outside of the object range (at the minimum focussing distance of lens 25, for example) so that only one distance will produce a given point separation on CCD system 30. Otherwise, range ambiguity could result. FIG. 2D shows the magnitude of the red pigment in a two-dimensional mask 20 that is used to produce the one-dimensional point spread function shown in FIG. 2A. The blue and green pigment is constant over the surface of mask 20.

Figure 2E:
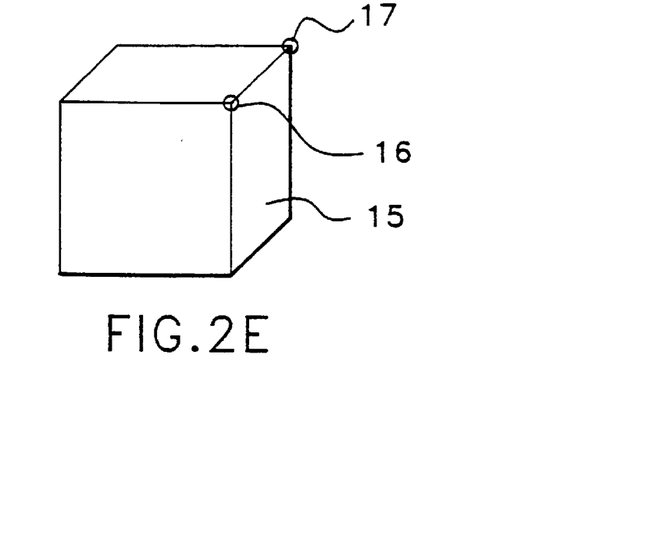
FIG. 2E shows a simple three- dimensional object.
Figure 2F:
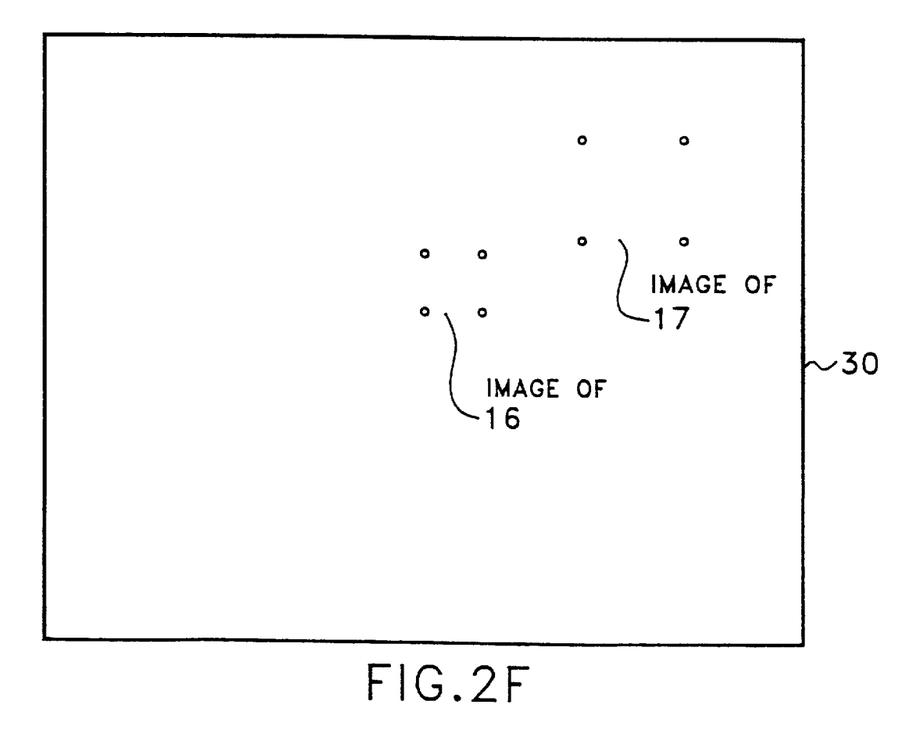
FIG. 2F shows the corresponding image of FIG. 2E on a CCD camera or similar image recording and retrieval device.

FIG. 2E shows a typical three-dimensional object 15 with two points 16 and 17 at different distances from mask 20. FIG. 2F shows how each of the points 16 and 17 are recorded on CCD 30, given the mask point spread function shown in FIG. 2A, and setting the range corresponding to point 21 somewhere between the mask and the closest point of object 15. Point 16, which is closer to point 21, produces an image that is similar to four dots close together, and point 17, further from point 21, would produce a similar image with the four dots further apart.

Figure 3A:
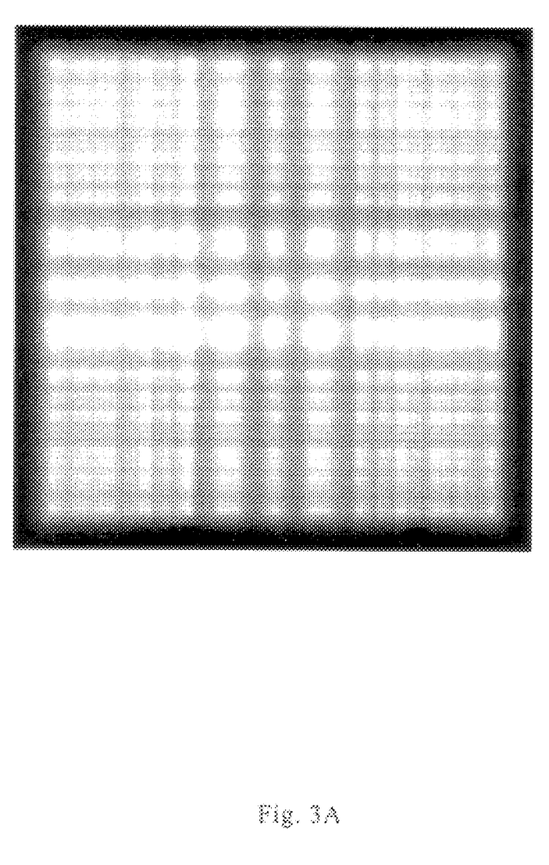
FIG. 3A is the magnitude of the two-dimensional mask implementing the one-dimensional point spread function shown in FIG. 3B on at least one color of light.
Figure 3B:
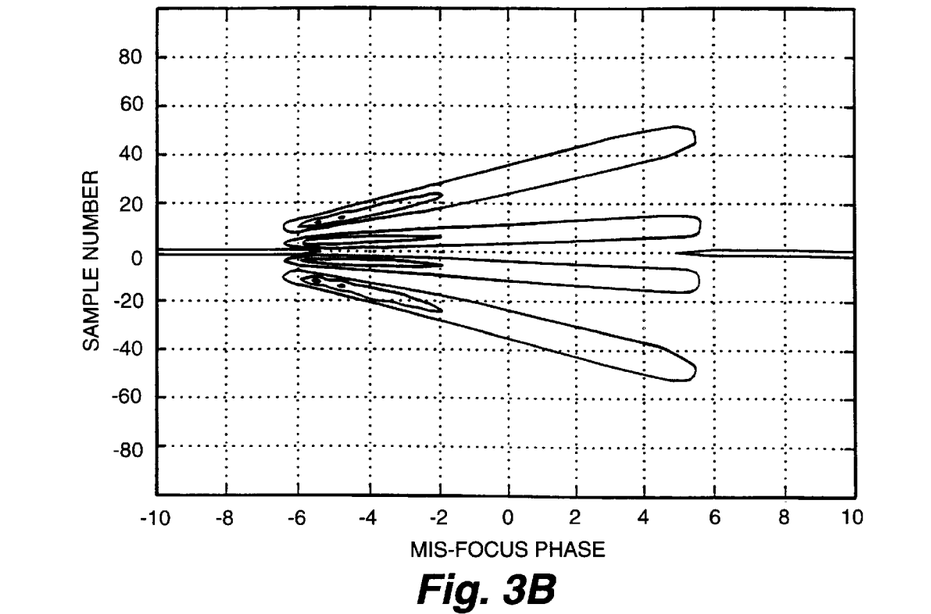

The mask 20 shown in FIG. 2D is conceptually easy to understand, but is optically inefficient, in that very little light gets through the mask. Those skilled in the art will understand that many types of mask will satisfy the needed mathematical matrix constraints, as long as they produce a rank deficient, known, image transformation matrix for each expected object range. The magnitude of the red pigment of one very efficient mask is shown in FIG. 3A. Its corresponding one-dimensional point spread function as a function of mis-focus is shown in FIG. 3B. Again, the blue and green pigment are constant over the surface of mask 20.

CCD system 30 measures and records the red light intensity that is received from mask 20. CCD systems, such as 30, are conventional and are currently available from a number of commercial sources. Alternatively, CCD system 30 may comprise a general purpose video camera that views and provides a digital image of stationary object 15, as object 15 is viewed through lens 25 and mask 20.

The light intensity values of small blocks of the image of object 15 (for example, 50 pixels by 50 pixels), as recorded by CCD 30, are digitally processed to yield a range, or distance estimate, for the corresponding small section or block of the object 15. Alternatively, it is possible to process overlapping blocks of image pixels to achieve range estimates that are closer together. Processing of the entire digital image of object 15; i.e., the entire output of CCD system 30 yields information which can be combined to form a three-dimensional range contour of object 15.

Figure 4:
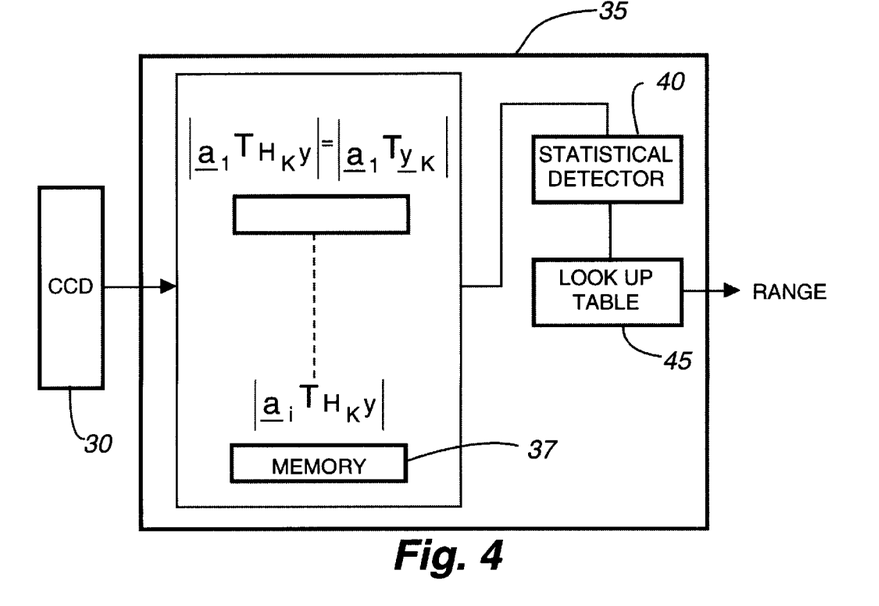
FIG. 4 is a block diagram of the digital processing apparatus shown in FIG. 1.

FIG. 4 is a block diagram of the digital image processing apparatus 35 of FIG. 1. The mathematics of the digital processing are described in an appendix that is within the file of this patent. It is accurate to consider the model for image formation as:

$$y_i = H_i u$$

where:
- i=the index corresponding to the range to the object
- $y_i$=a small block of pixel data arranged in a vector format within CCD 30,
- $H_i$=the imaging system transformation matrix composed of the point spread function of mask 20 for points at the distance of u, and
- u=the corresponding intensity vector of object 15 which forms the image vector $y_i$.

$$H_i = \begin{vmatrix} \underline{h}_{L-1} & \underline{h}_{L-2} & \ldots & \underline{h}_1 \ldots \underline{h}_0 & \ldots 0 \\ & & & & \\ 0 & \underline{h}_{L-1} & \ldots & \underline{h}_1 \ldots \underline{h}_0 & \ldots 0 \\ & & & & \\ \ldots & & \ldots & & \\ & & & & \\ \ldots & & \ldots & & \\ & & & & \\ \ldots & & \ldots & & \\ & & & & \\ 0 \ldots & \underline{h}_{L-1} & \ldots & & \underline{h}_1 \ldots \underline{h}_0 \end{vmatrix} \text{ where } \underline{h} = \begin{vmatrix} h_0 \\ h_1 \\ \ldots \\ \ldots \\ \ldots \\ h_{L-1} \end{vmatrix}$$

h is the length L sampled incoherent impulse response for points at the distance of object block u.

Then finding a vector $a_i^T$ such that $|a_i^T y_i|^2 = 0$, and
$|a_i^T y_j|^2 = \backslash 0$ unless i=j, then
$|a_i^T H_i u|^2 = 0$ also.

Where $|.|^2$ is the magnitude squared function and $(\cdot)^T$ denotes vector transpose.

Since $H_i$ is associated with the range of the object block, the particular vector $a_i^T$, which when multiplied by $H_i$, gives a zero result, or a result closest to zero, is associated with a particular range. It can be said that vector $a_i$ annihilates the sampled image vector $y_i$ formed with $H_i$ independently of the intensity of object block u, being dependent only on the range to the object block u. Each $a_i^T$ is stored in a digital computer, for example, and tried in turn. The set of multiplication values obtained is stored as shown in memory block 37.

Of course, only particular known ranges actually produce a value of zero for any $a_i^T$ (within the limits of system noise), but by using statistical detector 40, the lowest power value is determined. In the preferred embodiment, statistical detector 40 is a maximum likelihood detector because it is statistically efficient detector. Those skilled in the art will appreciate that it is possible to use a variety of detection/estimation algorithms to detect range, all using the same null space characteristics of the optical mask. Look up table 45 correlates the $a_i^T$, associated with the lowest power value found, to the approximate range of the sample block for the object. If the lowest power value is zero, than the range is exact (within system noise limits).

Digital processing in FIG. 4 is done on each block of light received from lens 25, and stored in CCD system 30 until a contour of the entire image of object 15 is constructed, thus effectively forming a three dimensional range contour of object 15. This range contour can be combined with the conventional image of the object to form a three-dimensional image.

This description has focussed on optical frequencies, but those skilled in the art will appreciate that this concept could easily extend to radar frequencies, thermal imaging, or even sonar. To implement a radar frequency system, for example, a series of antennas would replace the lens.

While the exemplary preferred embodiments of the present invention are described herein with particularity, those having normal skill in the art will readily recognize various changes, modifications, additions and applications other than those specifically mentioned herein without departing from the spirit of the invention. The file of this patent contains appendices.

What is claimed is:

1. Apparatus for estimating the distance from an observation location to various points in a three-dimensional scene that contains a three-dimensional object while imaging the scene, comprising:

a color optical mask means at said observation location constructed and arranged to yield a rank deficient, known, imaging system transformation matrix for a predetermined spread of object distances for at least a first color of light, thereby encoding object distance information onto the intensity field of said first color of light passing through said mask means, said color mask means permitting at least a second color of light to pass through said mask substantially unchanged, means for separating the first color of light from the second color of light, imaging means for forming an image of said scene from said second color of light, image recording and retrieval means for digitally recording the intensity of said distance encoded first color of light, and digital processing means for extracting said distance information from said digitally recorded intensity of said distance encoded first color of light.

2. The apparatus of claim 1 wherein said optical mask means comprises optical material having variations in opaqueness for at least one pigment providing said rank deficient, known, imaging system transformation matrices for said predetermined spread of object distances, said optical material having constant levels of at least a second pigment.

3. The apparatus of claim 2 wherein said mask means is formed by imaging a high resolution visual display in a first color corresponding to said rank deficient, known, imaging system transformation matrices onto color photographic film, and imaging a constant level of a second color onto said film, said film when developed forming said mask means.

4. A system for estimating the distance to various points in a three-dimensional scene, comprising;
   a lens,
   a mask constructed and arranged to yield a rank deficient, known, imaging system transformation matrix for at least a first color of light for a predetermined spread of scene distances, thereby encoding distance information into the intensity of the first color of light passing through said mask, while permitting at least a second color of light to pass through said lens substantially unchanged except for constant attenuation,
   means for separating the first color of light from the second color of light, and
   distance detecting means responsive to said encoded distance information on said first color of light.

5. A method for estimating the distance to various points in a three-dimensional scene that contains a three-dimensional object, comprising the steps of:
   passing light from the scene through a color optical mask constructed and arranged to yield a rank deficient, known, imaging system transformation matrix for at least a first color of light for a predetermined spread of object distances, thereby encoding distance information into the intensity of the first color of light passing through said mask,
   permitting at least a second color of light to pass through said mask substantially unchanged except for a constant attenuation factor,
   separating the first color of light from the second color of light,
   forming an image from the second color of light,
   recording the intensity of the first color of light onto an image recording and retrieval device, and
   processing said recorded intensity of the first color of light to extract said distance information therefrom.

6. The method of claim 5 wherein said processing step comprises the steps of:
   extracting said imaging system transformation matrix for a small block of scene pixels stored in said image recording and retrieval device,
   storing a set of vectors associated with various known distances such that multiplying one of said stored vectors by a given imaging system transformation matrix produces a multiplication value of zero if, and only if, said given imaging system transformation matrix was produced by a point in the object at a distance that is associated with said one of said stored vectors,
   multiplying said extracted imaging system transformation matrix by each of said stored vectors and storing a set of multiplication values produced thereby,
   utilizing a statistical detector to select a multiplication value from said set that is equal to or closest to zero,
   assigning a distance value associated with the vector that produced said selected multiplication value equal to, or closest to, zero to the portion of the scene which produced said small block of scene pixels, and
   repeating above said extracting, storing, multiplying, utilizing and assigning steps for each small block of scene pixels stored in said image recording and retrieval device.

7. The method of claim 6 wherein utilizing step utilizes a maximum likelihood detector as said statistical detector.

8. The method of claim 6 wherein said repeating step repeats said claim 6 method steps for overlapping blocks of scene pixels stored in said image recording and retrieval device.

9. Apparatus for modifying the optical image of an object in order to encode said image with information representing a physical parameter that is associated with said object, comprising:
   a color optical mask constructed and arranged to yield a rank deficient, known, transformation matrix for a first color of light from said image so that said first color of light will contain information representative of said parameter associated with said object;
   said mask further constructed and arranged to permit at least a second color of light to pass through said mask substantially unaffected except for a constant attenuation factor;
   separation means for separating said first color of light from said second color of light;
   first detecting means responsive to the output of said mask for detecting said information contained on said first color of light; and
   second detecting means for detecting said second color of light.

* * * * *